United States Patent
Duval et al.

(10) Patent No.: US 9,655,154 B2
(45) Date of Patent: May 16, 2017

(54) DEVICE-TO-DEVICE WIRELESS COMMUNICATION

(71) Applicant: FUJITSU LIMITED, Kawasaki-shi, Kanagawa (JP)

(72) Inventors: Olivier Duval, San Mateo, CA (US); Akira Ito, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 239 days.

(21) Appl. No.: 14/180,902

(22) Filed: Feb. 14, 2014

(65) Prior Publication Data
US 2015/0098382 A1 Apr. 9, 2015

Related U.S. Application Data

(60) Provisional application No. 61/886,971, filed on Oct. 4, 2013.

(51) Int. Cl.
 *H04W 76/02* (2009.01)
 *H04W 88/04* (2009.01)
 *H04L 12/18* (2006.01)

(52) U.S. Cl.
 CPC ....... *H04W 76/023* (2013.01); *H04L 12/1845* (2013.01); *H04W 88/04* (2013.01)

(58) Field of Classification Search
 None
 See application file for complete search history.

(56) References Cited

U.S. PATENT DOCUMENTS

| | | |
|---|---|---|
| 6,751,248 B1 | 6/2004 | Tan |
| 7,929,478 B2 | 4/2011 | Kim et al. |
| 2006/0094371 A1 | 5/2006 | Nguyen |

(Continued)

FOREIGN PATENT DOCUMENTS

| | | |
|---|---|---|
| CN | 101635882 B | 1/2010 |
| WO | 2007/125514 A2 | 11/2007 |

(Continued)

OTHER PUBLICATIONS

Extended European Search Report for EP Application No. 14179676.3, mailed Mar. 6, 2015.

(Continued)

*Primary Examiner* — Hassan Phillips
*Assistant Examiner* — Omeed D Rahgozar
(74) *Attorney, Agent, or Firm* — Maschoff Brennan (57) ABSTRACT

A method of device-to-device communication by a wireless device in a wireless communication network may include transmitting a first packet that includes first message data to multiple neighboring wireless devices in the wireless communication network. The method may also include receiving a second packet from one of the multiple neighboring wireless devices. The second packet may be generated by a second wireless device in the wireless communication network that is not one of the multiple neighboring wireless devices. The second packet may include second message data generated by the second wireless device and the first message data. In response to receiving the second packet, the method may further include transmitting a third packet configured to be unicast to the second wireless device. The third packet may include third message data generated by the wireless device.

22 Claims, 6 Drawing Sheets

(56) References Cited

U.S. PATENT DOCUMENTS

| | | |
|---|---|---|
| 2008/0113640 A1 | 5/2008 | Bennet |
| 2008/0181176 A1 | 7/2008 | Lee et al. |
| 2010/0014458 A1* | 1/2010 | Singh .................. H04W 72/048 |
| | | 370/328 |
| 2010/0087149 A1 | 4/2010 | Srinivasan et al. |
| 2012/0051257 A1 | 3/2012 | Kim et al. |
| 2012/0163252 A1 | 6/2012 | Ahn et al. |
| 2012/0213261 A1 | 8/2012 | Sayana et al. |
| 2012/0269077 A1 | 10/2012 | Bazzi et al. |
| 2014/0348055 A1* | 11/2014 | Hoymann .......... H04B 7/15557 |
| | | 370/315 |

FOREIGN PATENT DOCUMENTS

| | | |
|---|---|---|
| WO | 2008/123850 A1 | 10/2008 |
| WO | 2010/074424 A3 | 7/2010 |
| WO | 2010/126312 A3 | 11/2010 |

OTHER PUBLICATIONS

International Search Report and Written Opinion dated Jul. 14, 2014 as received in Application No. PCT/US2014/023732.

Supporting multi-party voice-over-IP services with peer-to-peer stream processing, Multimedia '05: Proc. of the 13th annual ACM int'l conference on Multimedia (2005), pp. 303-306, doi:10.1145/1101149.1101210, Xiaohui Gu, Zhen Wen, Philip S. Yu, Zon-Yin Shae.

* cited by examiner

DEVICE-TO-DEVICE WIRELESS COMMUNICATION

CROSS-REFERENCE TO RELATED APPLICATIONS

This application is based upon and claims the benefit of priority of U.S. Provisional Application No. 61/886,971, filed on Oct. 4, 2013, the entire contents of which are incorporated herein by reference.

FIELD

The present disclosure relates to device-to-device wireless communication.

BACKGROUND

The proliferation of smartphones, tablets, laptop computers, and other electronic devices (referred to generally as "wireless devices") that use wireless communication networks has created an increased demand for continuous wireless voice and data access. It is becoming increasingly attractive to use wireless devices in a wireless communication network as relaying points to provide the continuous wireless access to wireless devices.

The subject matter claimed herein is not limited to embodiments that solve any disadvantages or that operate only in environments such as those described above. Rather, this background is only generated to illustrate one example technology area where some embodiments described herein may be practiced.

SUMMARY

According to an aspect of an embodiment, a method of device-to-device communication by a wireless device in a wireless communication network may include transmitting a first packet that includes first message data to multiple neighboring wireless devices in the wireless communication network. The method may also include receiving a second packet from one of the multiple neighboring wireless devices. The second packet may be generated by a second wireless device in the wireless communication network that is not one of the multiple neighboring wireless devices. The second packet may include second message data generated by the second wireless device and the first message data. In response to receiving the second packet, the method may further include transmitting a third packet configured to be unicast to the second wireless device. The third packet may include third message data generated by the wireless device.

The object and advantages of the embodiments will be realized and achieved at least by the elements, features, and combinations particularly pointed out in the claims.

It is to be understood that both the foregoing general description and the following detailed description are exemplary and explanatory and are not restrictive of the present disclosure, as claimed.

BRIEF DESCRIPTION OF THE DRAWINGS

Example embodiments will be described and explained with additional specificity and detail through the use of the accompanying drawings in which.

DESCRIPTION OF EMBODIMENTS

According to an aspect of an embodiment, a wireless communication network including multiple wireless devices may be configured to enable device-to-device (D2D) communication between the wireless devices to facilitate broadcasting message data, such as voice data, to all the multiple wireless devices in the wireless communication network. To broadcast the message data, a first wireless device configured to broadcast first message data may broadcast a first packet with the first message data to its neighboring wireless devices. The neighboring wireless devices may relay the first packet to other neighboring wireless devices. Once the first packet is received by a second wireless device that is also broadcasting message data, the second wireless device may aggregate the first message data with second message data generated by the second wireless device and broadcast the aggregated first and second message data in a second packet. The first wireless device may receive the second packet. After receiving the second packet, the first wireless device may unicast further packets with additional message data to the second wireless device so that the additional message data in the further packets may be aggregated with further message data generated by the second wireless device. The second wireless device may broadcast the aggregated message data from both the first and second wireless devices to all the wireless devices in the wireless communication network. As a result, only the second wireless device may be broadcasting to all the wireless devices in the wireless communication network but all the wireless devices in the wireless communication network may be receiving the message data generated by both the first and second wireless devices. By having the first wireless device unicast to the second wireless device instead of broadcast to all the wireless devices, fewer resources may be used by the wireless communication network. In some embodiments, the second wireless device may unicast aggregated message data from the first and second wireless devices to a third wireless device. The third wireless device may aggregate the message data from the first and second wireless devices with message data from the third wireless device and broadcast the aggregated message data. In some embodiments, the network may include any number of wireless devices that may unicast to other wireless devices as described above, with one wireless device broadcasting the aggregation of data from the unicasts to all wireless devices in the network.

Embodiments of the present disclosure will now be explained with reference to the accompanying drawings.

Figure 1:
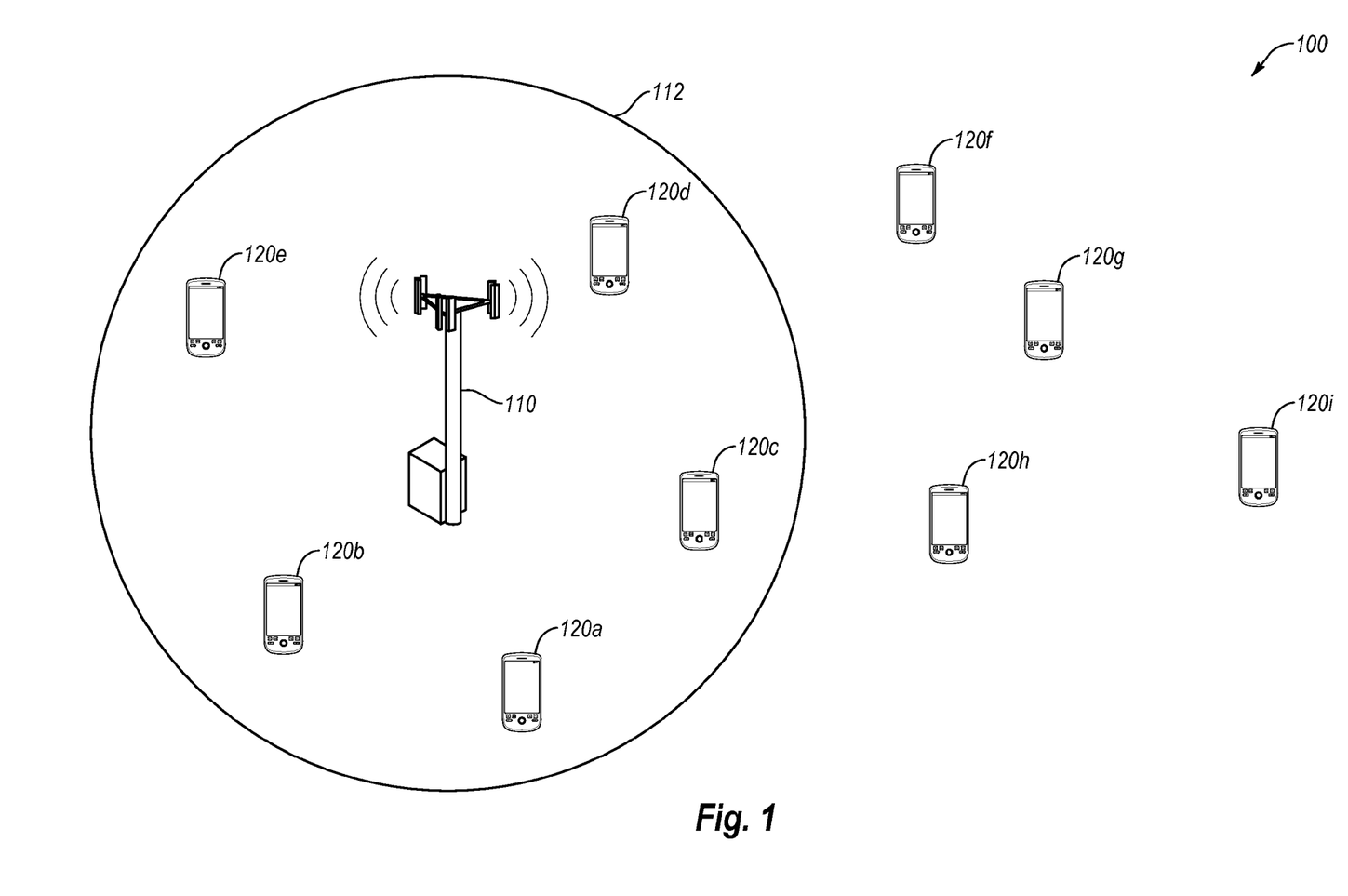
FIG. 1 illustrates an example wireless communication network.

FIG. 1 illustrates an example wireless communication network 100 (referred to hereinafter as "network 100"), arranged in accordance with at least one embodiment of the present disclosure. The network 100 may be configured to provide wireless communication services to one or more wireless devices 120. In some embodiments, some of the wireless communication services may be supervised by one or more access points 110. Alternately or additionally, some of the wireless communication services may be supervised by the wireless devices 120. For example, some device-to-device (D2D) communications between the wireless devices 120 may be supervised by the wireless devices 120 without supervision by the access point 110.

The wireless communication services may be voice services, data services, message services and/or any suitable combination thereof. The network 100 may include a Frequency Division Multiple Access (FDMA) network, an Orthogonal FDMA (OFDMA) network, a Code Division Multiple Access (CDMA) network, a Time Division Multiple Access (TDMA) network, a Single-Carrier Frequency-Division Multiple Access (SC-FDMA), and/or any other suitable wireless communication network. In some embodiments, the network 100 may be configured as a third generation (3G) wireless communication network and/or a fourth generation (4G) wireless communication network. In these or other embodiments, the network 100 may be configured as a long term evolution (LTE) wireless communication network and/or as an LTE-advanced (LTE-A) wireless communication network.

The access point 110 may be any suitable wireless communication network communication point and may include, by way of example but not limitation, a base station, an evolved node "B" (eNB) base station, a remote radio head (RRH), a LTE smart cell, or any other suitable communication point. The wireless devices 120 may include any devices that may use the network 100 for obtaining wireless communication services and may include, by way of example and not limitation, a cellular phone, a smartphone, a personal data assistant (PDA), a laptop computer, a personal computer, a tablet computer, or any other similar device.

In some embodiments, as illustrated, the wireless devices 120a-120e may be within an area, referred to as a cell 112, that is serviced by the access point 110 such that the access point 110 may be configured to directly wirelessly communicate with the wireless devices 120a-120e. The wireless devices 120f-120i may be outside the cell 112. As a result, the wireless devices 120f-120i may not have direct wireless communication with the access point 110. In some embodiments, the access point 110 may be able to communicate with the wireless devices 120f-120i by relaying communications through the wireless devices 120 using D2D communications. In some embodiments, all of the wireless devices 120 in the network 100 may be within the cell 112 or within a cell that allows the wireless devices 120 to communicate with the access point 110 or another access point. Alternately or additionally, the wireless devices 120 may be located such that none of the wireless devices 120 may be able to communicate with an access point. In these embodiments, the wireless devices 120 may communicate using D2D communications. In these and other embodiments, the wireless devices 120 may be the only devices in the network 100.

To perform D2D communications within the network 100, the wireless devices 120 may first discover the wireless devices 120 within the network 100 with which the wireless devices 120 may wirelessly communicate. The wireless devices 120 with which the wireless devices 120 may communicate may be considered the neighbors of the wireless devices 120. For example, the wireless device 120a may have wireless devices 120b and 120e as neighbors where wireless devices 120d-120i may be positioned such that they are not neighbors of the wireless device 120a. In some embodiments, the wireless devices 120 may keep a list of their neighbors and periodically update the list of their neighbors.

The wireless devices 120 may determine their neighboring wireless devices 120 using various types of discovery signals, such as described in U.S. patent application Ser. No. 13/828,457 by Zhu et al., filed on Mar. 14, 2013 and entitled "NETWORK SUPERVISED WIRELESS DEVICE NEIGHBOR DISCOVERY" and such as described in U.S. patent application Ser. No. 13/828,617 by Zhu et al., filed on Mar. 14, 2013 and entitled "POWER CONTROL OF NEIGHBOR DISCOVERY SIGNALS," the entire contents of both of which are incorporated herein by reference.

Furthermore, the wireless devices 120 may determine transmission parameters for D2D communications as described in U.S. patent application Ser. No. 13/830,342 by Zhu et al., filed on Mar. 14, 2013, and entitled "NETWORK SUPERVISED DEVICE-TO-DEVICE COMMUNICATION," and such as described in U.S. patent application Ser. No. 14/109,650 by Zhu, et al., filed on Dec. 17, 2013 and entitled "WIRELESS COMMUNICATION PRECODER DETERMINATION," the entire contents of which are incorporated herein by reference.

After determining their neighbors, the wireless devices 120 may use D2D communications to distribute message data, such as data resulting from voice, messaging, or data services, among other types of data, from one of the wireless devices 120 to all of the wireless devices 120 in the network 100. In some embodiments, while the wireless device 120 use D2D communications to distribute message data, the wireless devices 120 may continue discovering their neighbors as described above because the wireless devices 120 may be continuously moving causing their neighboring wireless devices 120 to change.

In some embodiments, the wireless devices 120 may operate to distribute the data amongst the wireless devices 120 without direction from the access point 110. In some embodiments, the wireless devices 120 may be configured such that a single wireless device 120 distributes message data from multiple wireless devices 120 to all of the wireless devices 120. For example, one wireless device 120 may be configured to receive message data from multiple of the wireless devices 120 using unicast communications, e.g., point-to-point communications. The wireless device 120 that receives the message data from the multiple of the wireless devices 120 may broadcast the message data from the multiple of the wireless devices 120 to all of the wireless devices 120 in the network 100. Further description regarding distribution of message data among a network and the D2D communications between wireless devices to distribute the message data is discussed with respect to FIGS. 2A-5.

Figure 2A:
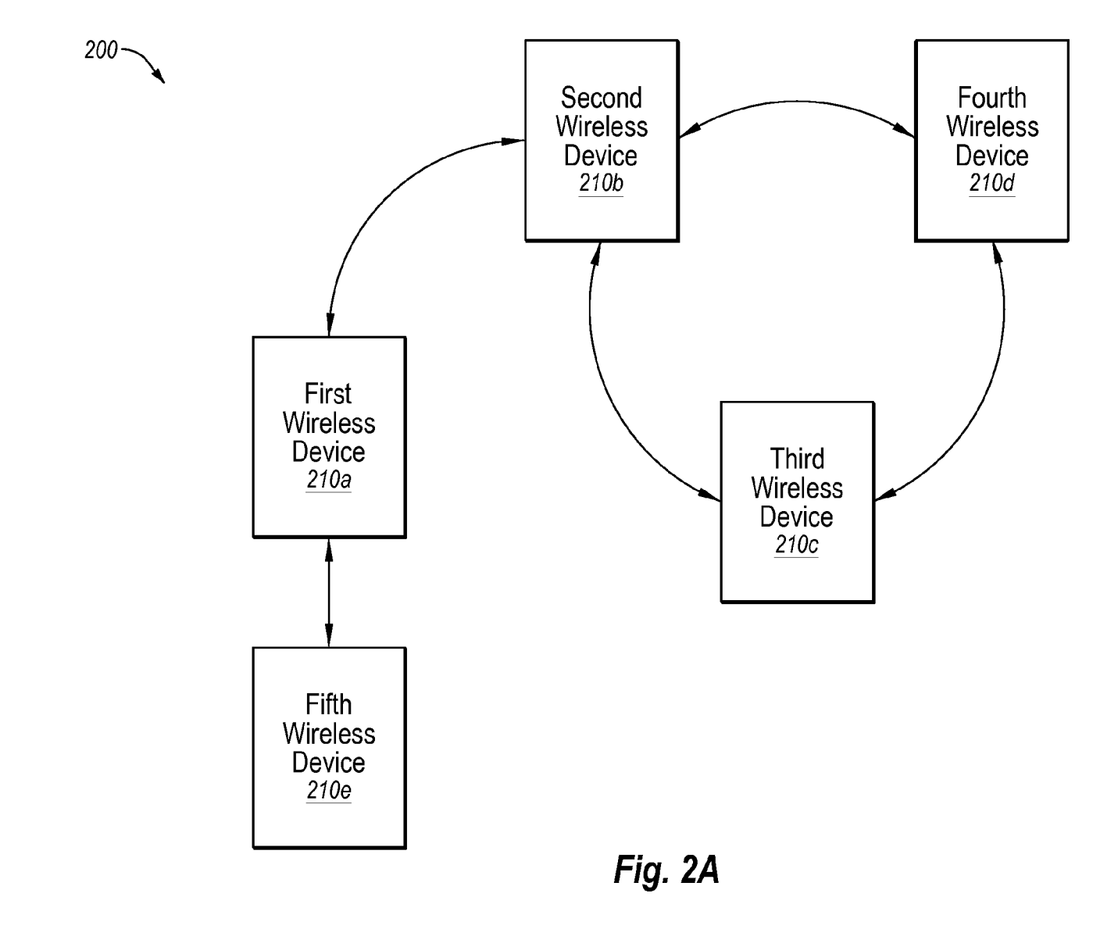
FIG. 2A illustrates another example wireless communication network.

FIG. 2A illustrates another example wireless communication network 200 (referred to hereinafter as "the network 200"), in accordance with at least one embodiment described herein. The network 200 includes first, second, third, fourth, and fifth wireless devices 210a, 210b, 210c, 210d, and 210e, referred to collectively as the wireless devices 210. The wireless devices 210 may be analogous to the wireless devices 120 of FIG. 1. In the illustrated embodiment of FIG. 2A, it is assumed that the wireless devices 210 have performed neighbor discovery and have a list or some other record of all or a majority of their neighboring devices. The arrows in FIG. 2A represent neighbor relationships for the devices 210 in FIG. 2A. For example, the first wireless device 210a has the second and fifth wireless devices 210b and 210e as neighbors; the fifth wireless device 210e has the first wireless device 210a as a neighbor; the second wireless device 210*b* has the first, third, and fourth wireless devices 210*a*, 210*c*, and 210*d* as neighbors; the third wireless device 210*c* has the second and fourth wireless devices 210*b* and 210*d* as neighbors; and the fourth wireless device 210*d* has the second and third wireless devices 210*b* and 210*c* as neighbors. In some embodiments, the wireless devices 210 may know of their neighbors based on the neighbor discovery but may not be informed about the other wireless devices 210 in the network 200.

The wireless devices 210 may be configured such that any message data generated by one of the wireless devices 210, such as voice data from an operator of the one of the wireless devices 210, is provided to all of the wireless devices 210 in the network 200. In the embodiment illustrated in FIG. 2A, no access point or other device may provide direction to the wireless devices 210 regarding how to distribute the message data among the wireless devices 210 using D2D communications.

During the distribution of message data, the wireless devices 210 may perform up to three different roles in some embodiments. The wireless devices 210 may be a talking wireless device that has message data to provide to the other wireless devices 210 and that is configured to transmit the message data to one or more of the other wireless device 210. Alternately or additionally, the wireless devices 210 may be a relaying wireless device configured to receive message data from one of the wireless devices 210 and to transmit the message data to other of the wireless devices 210. Alternately or additionally, the wireless devices 210 may be a sink wireless device that receives message data but does not transmit message data. Additionally or alternatively, a talking wireless device may be a broadcasting talking wireless device or a unicasting talking wireless device. A unicasting talking wireless device may have message data to provide to other of the wireless devices 210 and is configured to unicast the message data to either a unicasting talking wireless device or a broadcasting talking wireless device. A broadcasting talking wireless device may have message data to provide to other wireless devices and is configured to broadcast the message data and/or other message data from other unicast talking wireless devices to all the wireless devices 210 in the network 200. The wireless devices 210 may switch between the different roles based on various factors, including the neighbors of the wireless devices 210, whether the neighbors of the wireless devices 210 have already received message data, whether the wireless devices 210 have message data to provide to other of the wireless devices 210, among other factors.

The wireless devices 210 may be configured to distribute the data using packets. The packets may include the message data to be distributed among the wireless devices 210 and other information to enable the wireless devices 210 to distribute the data. For example, the packets may include type data regarding the type of packet. For example, the type data may indicate that it is a packet for broadcasting to all the wireless devices 210. Alternately or additionally, the type data may indicate that the packet is for unicasting to a particular wireless device of the wireless devices 210. Alternately or additionally, the type data may indicate that the packet is for broadcasting to all the wireless devices 210 and that the packet includes additional information for establishing, maintaining, and/or terminating a unicast between two of the wireless devices 210.

The packets may include additional information as well. For example, the packets may include information about the wireless devices 210 in the network that have transmitted the packet. The information about the wireless devices 210 that have transmitted the packet may be used by a wireless device to determine one or more unicast paths for unicasting future packets between two of the wireless devices 210. Alternately or additionally, the information about the wireless devices 210 that have transmitted the packet may be used by wireless devices 210 to determine which wireless devices have received the packet and if the packet needs to be retransmitted. Alternately or additionally, the packets may include information about timing and scheduling for future transmission of the packets by other of the wireless devices 210 in the network 200. For example, when a packet is transmitted to neighboring wireless devices 210, each of the neighboring wireless devices 210 may be assigned a radio resource, such as a time slot, for relaying or retransmitting the packet by the wireless device 210 that transmits the packet. By assigning radio resources for retransmission for each neighboring wireless device, conflicts between neighboring wireless devices transmitting at the same time may be avoided.

The wireless devices 210 may be configured such that multiple wireless devices 210 may be providing message data to the other wireless devices 210 at the same time. However, the wireless devices 210 may be configured such that one of the wireless devices 210 broadcasts an aggregation of the message data being generated by the multiple wireless devices 210 to all or substantially all of the wireless devices 210 in the network 200. By having one wireless device 210 broadcast to all or substantially all of the wireless devices 210 in the network 200, resources of the network may be conserved.

A general example of multiple wireless devices 210 providing message data to the network 200 at the same time follows. The first wireless device 210*a* may broadcast first message data in a first packet to all of the wireless devices 210. The third wireless device 210*c* may also be broadcasting second message data to all of the wireless devices 210. The third wireless device 210*c* may receive the first packet with the first message data from the first wireless device 210*a*. The third wireless device 210*c* may aggregate the first message data with its second message data and broadcast the aggregated message data to all of the wireless devices 210 in a second packet. The second packet may also include unicast path data describing a unicast path between the first and third wireless devices 210*a* and 210*c*. The unicast path data may be determined by the third wireless device 210*c* based on data in the first packet. The first wireless device 210*a*, upon receiving the second packet from the third wireless device 210*c*, may begin to unicast third message data to the third wireless device 210*c* based on the unicast path data. The third wireless device 210*c* may receive the third message data from the first wireless devices 210*a* and aggregate the third message data from the unicast with fourth message data generated by the third wireless device 210*c*. The third wireless device 210*c* may broadcast the aggregated third and fourth message data to all the wireless devices 210. The first wireless device 210*a* may confirm that the third wireless device 210*c* received its unicast and the unicast configuration between the first wireless device 210*a* and the third wireless device 210*c* is being maintained when the first wireless device 210*a* receives the aggregated third and fourth message data broadcast by the third wireless device 210*c*.

This unicasting, aggregation, and broadcasting of message data may continue until either the first and/or third wireless devices 210*a* and 210*c* does not have more message data to provide to the wireless devices 210 or one or more of the first and/or third wireless devices decides to end the unicast relationship between the first and third wireless devices 210a and 210c. Thus, all the wireless devices 210 may receive message data from both the first and third wireless devices 210a and 210c with just the third wireless device 210c broadcasting to all of the wireless devices 210.

Figure 2B:
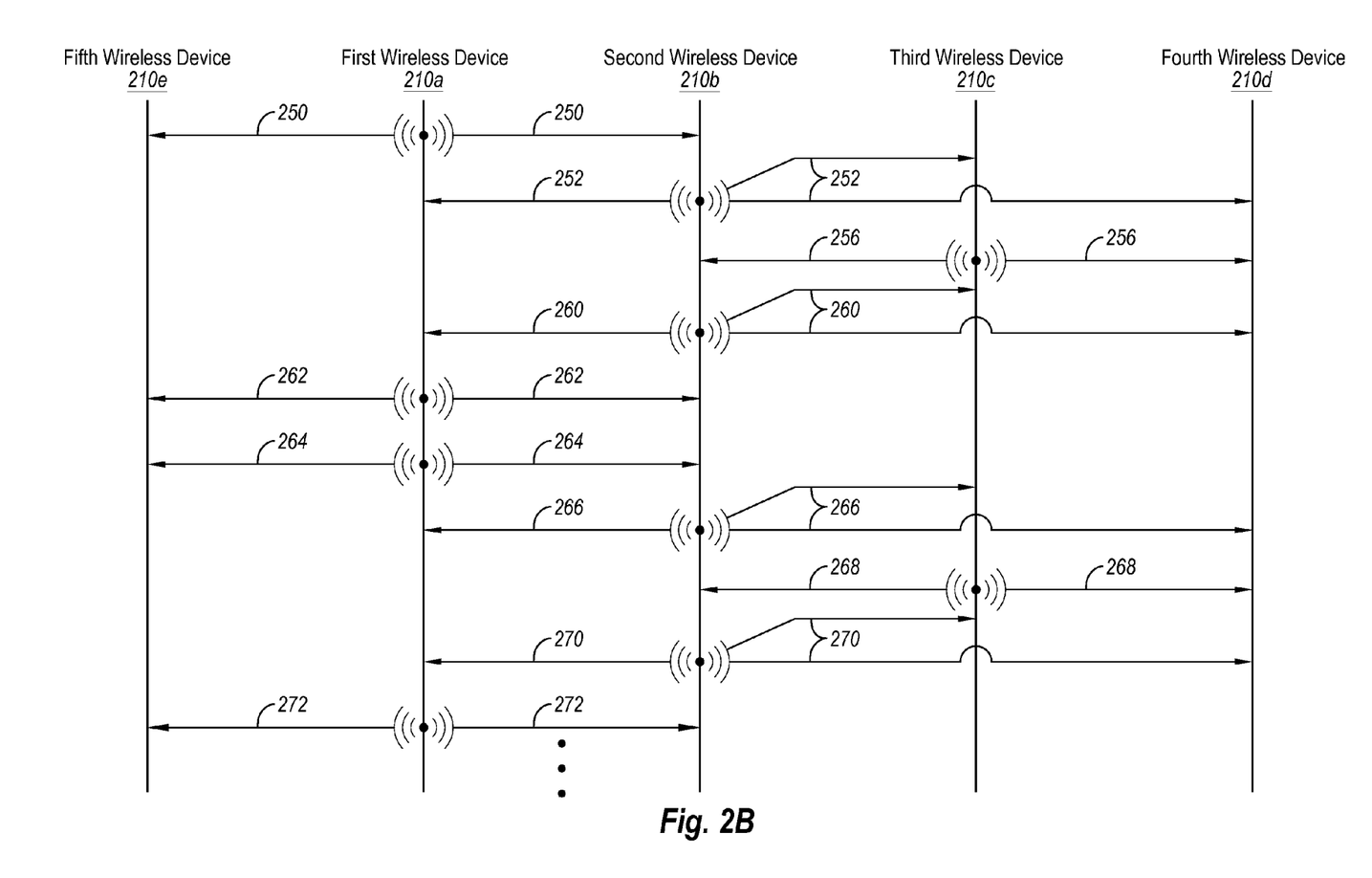
FIG. 2B illustrates example signaling within the example wireless communication network of FIG. 2A.

FIG. 2B illustrates example signaling within the network 200 of FIG. 2A, in accordance with at least one embodiment described herein. In particular, FIG. 2B illustrates D2D communications among the wireless devices 210 that provides for the distribution of message data amongst the wireless devices 210. In this example, the first wireless device 210a may be a talking wireless device that starts as a broadcasting talking wireless device and becomes a unicast talking wireless device. The second wireless device 210b may be a relay wireless device. The third wireless device 210c may be a broadcasting talking wireless device. The fourth and fifth wireless devices 210d and 210e may be sink wireless devices.

The first wireless device 210a may have message data to distribute to the wireless devices 210. For example, a user of the first wireless device 210a may speak into the first wireless device 210 and the first wireless device 210 may convert what is spoken by the user into message data. The first wireless device 210 may generate a packet 250 that includes the message data, an indication of the neighbors of the first wireless device 210a, and that the packet 250 is to be broadcast to all of the wireless devices 210. The first wireless device 210a may transmit the packet 250. The neighbors of the first wireless device 210, e.g., the second and fifth wireless devices 210b and 210e, may receive the packet 250.

The fifth wireless device 210e, being a sink wireless device, may not relay the packet 250 because all of the neighbors of the fifth wireless device 210e (e.g., the first wireless device 210a) may have received or transmitted the packet 250. The second wireless device 210b may modify the packet 250 to generate a modified packet 252. The modified packet 252 may include the information from the packet 250 as well as an indication that the second wireless device 210b is relaying the packet 250 and an indication of the neighbors of the second wireless device 210b. The second wireless device 210b may transmit the packet 252.

The first wireless device 210a may receive and ignore the modified packet 252 because it contains the message data from the packet 250 transmitted by the first wireless device 210a originally. The fourth wireless device 210d may receive the packet 252. Based on the information in the modified packet 252, the fourth wireless device 210d may determine that all of its neighbors have already received the modified packet 252 and take no further action.

The third wireless device 210c may also receive the modified packet 252. The third wireless device 210c may have message data to provide to the wireless devices 210. As a result, the third wireless device 210c may aggregate its message data with the message data from the modified packet 252. The third wireless device 210c may also generate unicast path data based on the information in the modified packet 252 that indicates the wireless devices 210 that relayed the data from the first wireless device 210a to the third wireless device 210c. The unicast path data may indicate a unicast path along the wireless devices 210 that a packet may travel from the first wireless device 210a to the third wireless device 210c.

The third wireless device 210c may generate a packet 256 that includes the aggregated data, the unicast path data, and the neighbors of the third wireless device 210c. The packet 256 may also indicate that the packet 256 is to be broadcast to all of the wireless devices 210. The third wireless device 210c may transmit the packet 256.

The fourth wireless device 210d may receive the packet 256. Based on the information in the packet 256, the fourth wireless device 210d may determine that all of its neighbors have already received the packet 256 and take no further action.

The second wireless device 210b may also receive the packet 256. Based on the information in the packet 256, the second wireless device 210b may determine that not all of its neighbors have received the packet 256. As a result, the second wireless device 210b may modify the packet 256 to generate a modified packet 260. The modified packet 260 may include the information from the packet 256 as well as an indication that the second wireless device 210b is relaying the data from the packet 250 and an indication of the neighbors of the second wireless device 210b. The second wireless device 210b may transmit the modified packet 260.

The third wireless device 210c may receive and ignore the modified packet 260 because it contains the message data from the packet 256 transmitted by the third wireless device 210c originally. The fourth wireless device 210d may also receive and ignore the modified packet 260 as it received the packet 256 previously.

The first wireless device 210a may also receive the modified packet 260. The first wireless device 210a may further modify the modified packet 260 to generate a modified packet 262 and transmit the modified packet 262. The second wireless device 210b may receive and ignore the modified packet 262 because it contains the message data from the packet 260 relayed by the second wireless device 210b. The fifth wireless device 210e may receive the modified packet 262. The fifth wireless device 210e, being a sink wireless device, may not relay the packet 250 as all the neighbors of the fifth wireless device 210e, e.g., the first wireless device 210a, may have received or transmitted the modified packet 262.

The first wireless device 210a may have additional message data to distribute to the wireless devices 210. The first wireless device 210a may generate a packet 264 that includes the additional message data and an indication of the wireless devices 210 in the unicast path data received in the modified packet 260 from the third wireless device 210c. The packet 264 may also include an indication that the packet is to be unicast to the third wireless device 210c. The first wireless device 210a may transmit the packet 264.

The fifth wireless device 210e may receive and ignore the packet 264 because the packet 264 is unicast to the third wireless device 210c and the fifth wireless device 210e is not in the unicast path between the first wireless data 210a and the third wireless device 210c as indicated in the packet 264.

The second wireless device 210b may receive the packet 264. Based on the information in the packet 264, the second wireless device 210b may determine that it is in the unicast path. As a result, the second wireless device 210b may modify the packet 264 to generate a modified packet 266. The modified packet 266 may include the information from the packet 264 as well as an indication that the second wireless device 210b is relaying the data from the packet 264. The second wireless device 210b may transmit the modified packet 266.

The fourth wireless device 210d may receive and ignore the modified packet 266 because the modified packet 266 is unicast to the third wireless device 210c and the fourth wireless device 210d is not in the unicast path between the first wireless device 210a and the third wireless device 210c as indicated in the modified packet 266.

The third wireless device 210c may receive the modified packet 266. The third wireless device 210c may aggregate some of its additional message data with the additional message data from the modified packet 266. The third wireless device 210c may generate a packet 268 that includes the aggregated additional message data and the neighbors of the third wireless device 210c. The packet 268 may also include an indication that the packet 268 is to be broadcast to all of the wireless devices 210. The third wireless device 210c may transmit the packet 268.

The fourth wireless device 210d may receive the packet 268. Based on the information in the packet 268, the fourth wireless device 210d may determine that all of its neighbors have already received the packet 268 and take no further action.

The second wireless device 210b may receive the packet 268. Based on the information in the packet 268, the second wireless device 210b may determine that not all of its neighbors have received the packet 268. As a result, the second wireless device 210b may modify the packet 268 to generate a modified packet 270. The modified packet 270 may include the information from the packet 268 as well as an indication that the second wireless device 210b is relaying the data from the packet 268 and an indication of the neighbors of the second wireless device 210b. The second wireless device 210b may transmit the modified packet 270.

The third wireless device 210c may receive and ignore the modified packet 270 because it contains the message data from the packet 268 transmitted by the third wireless device 210c originally. The fourth wireless device 210d may receive and ignore the modified packet 270 as it received the packet 268 from which the modified packet 270 is generated.

The first wireless device 210a may also receive the modified packet 270. The first wireless device 210a may modify the modified packet 270 to generate a modified packet 272 and transmit the modified packet 272. The second wireless device 210b may receive and ignore the modified packet 272 because it contains the data from the packet 270 transmitted by the second wireless device 210b. The fifth wireless device 210e, being a sink wireless device, may not relay the modified packet 272 as all the neighbors of the fifth wireless device 210e, e.g., the first wireless device 210a, may have received the modified packet 272.

Modifications, additions, or omissions may be made to the example signaling and example network 200 without departing from the scope of the present disclosure. For example, the network 200 may include additional wireless devices and/or the signaling may be different between the wireless devices 210 and/or the new wireless devices. Alternately or additionally, the packets transmitted and received may include more or less information than described herein.

Figure 3:
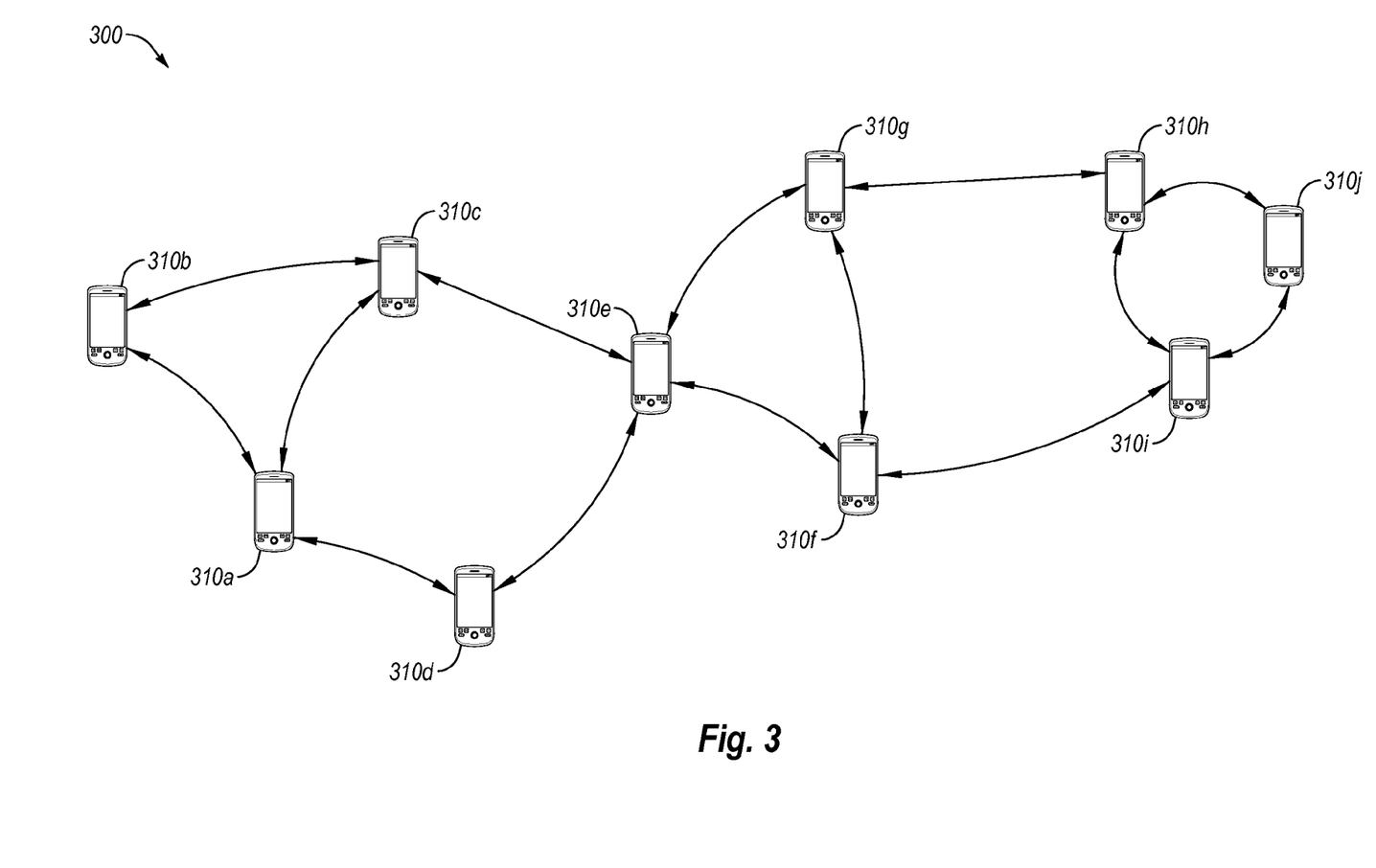
FIG. 3 illustrates another example wireless communication network.

FIG. 3 illustrates another example wireless communication network 300 (referred to hereinafter as "the network 300"), in accordance with at least one embodiment described herein. The network 300 includes wireless devices 310a-310j, referred to collectively as wireless devices 310. Each of the wireless devices 310 may include information about its neighbors. The neighbor relationships between the wireless devices 310 are denoted by arrows between the wireless devices 310 in FIG. 3. For example, the wireless device 310a may include the wireless devices 310b-310d as neighbors and the wireless device 310g may include the wireless devices 310e, 310f, and 310h as neighbors.

An example of the distribution of message data within the network 300 follows. The wireless device 310a may have first message data to distribute to the network 300. The wireless device 310 may broadcast a first packet with the first message data. The first packet may indicate a schedule for the neighbors of the wireless device 310a to retransmit the first packet. The schedule may include the wireless device 310c retransmitting the first packet in a first time slot, the wireless device 310d retransmitting the first packet in a second time slot following the first time slot, and the wireless device 310b retransmitting the first packet in a third time slot following the second time slot.

The wireless device 310c may update the first packet to indicate that the wireless device 310c is retransmitting the first packet. The wireless device 310c may also update the first packet to include its neighboring wireless devices and scheduling information for its neighboring wireless devices. The wireless device 310c may transmit the updated first packet in the first time slot.

The wireless device 310d may also update the first packet to indicate that the wireless device 310d is retransmitting the first packet. The wireless device 310d may also update the first packet to include its neighboring wireless devices and scheduling information for its neighboring wireless devices. The wireless device 310d may transmit the updated first packet in the second time slot.

The wireless device 310b may not retransmit the first packet based on the information in the first packet that indicates that the neighbors of the wireless device 310b have received the first packet.

The wireless device 310e may receive the updated first packet retransmitted by the wireless devices 310c and 310d. Because the updated first packet from the wireless device 310c is transmitted first, the wireless device 310e may receive and keep the updated first packet from the wireless device 310c but ignore the updated first packet from the wireless device 310d.

The wireless device 310e may update the updated first packet to indicate that the wireless device 310e is retransmitting the updated first packet. The wireless device 310e may also update the updated first packet to include its neighboring wireless devices and scheduling information for its neighboring wireless devices. The wireless device 310e may transmit the updated first packet based on its scheduled time slot as determined by the wireless device 310c and indicated in the packet received by the wireless device 310e.

The first packet may continue to be distributed through the network 300 in a similar manner as described above with each of the wireless devices 310 receiving the first packet and determining whether to retransmit the first packet as indicated. Details regarding the scheduling of retransmission for the wireless devices 310 and some other information included in the packets are omitted from the remainder of the description with respect to FIG. 3.

The wireless device 310f may also have message data to broadcast and may be broadcasting packets with the message data. The wireless device 310f may receive the first packet with the first message. The wireless device 310f may determine to aggregate the first message with second message data generated by the wireless device 310f and transmit the aggregated first and second message data in a second packet. The wireless device 310f may also include unicast path data indicating a unicast path between the wireless device 310a and the wireless device 310f to allow the wireless device 310a to unicast further message data to the wireless device 310f. The unicast path data may indicate a unicast path that includes the wireless devices 310c and 310e. Alternately or additionally, the unicast path may include wireless devices 310d, 310e, and 310g. The different unicast paths may result from different scheduling of retransmission, different availability of some of the wireless devices 310, among other factors. The wireless device 310*f* may broadcast the second packet such that the packet may be distributed through the network 300 to all of or substantially all of the wireless devices 310.

After receiving the second packet, the wireless device 310*a* may generate a third packet with third message data. The third packet may be a unicast packet to be unicast to the wireless device 310*f*. The wireless device 310*a* may unicast the third packet to the wireless device 310*f*.

The wireless device 310*h* may also receive the second packet from the wireless device 310*f* by way of the wireless device 310*g* and the wireless device 310*i*. The wireless device 310*h* may also have message data to broadcast. The wireless device 310*h* may thus aggregate the aggregated first and second message data with fourth message data generated by the wireless device 310*h*. The wireless device 310*h* may also generate a fourth packet that includes the aggregated first, second, and fourth message data and unicast path data between the wireless devices 310*f* and 310*h*. The wireless device 310*h* may select the unicast path using the wireless device 310*i* or 310*g* depending on one or more factors, such as unicast path length; characteristic of wireless channels between the wireless devices 310 in the unicast paths; characteristics of the wireless devices 310 in the unicast paths, such as power availability, access point connectivity; among other factors. The wireless device 310*h* may broadcast the fourth packet to all of the wireless devices 310 in the network 300.

The wireless device 310*f* may receive the broadcast fourth packet generated by the wireless device 310*h*. The wireless device 310*f* may determine to start to unicast packets to the wireless device 310*h* to allow the wireless device 310*h* to broadcast packets to all of the wireless devices 310. The wireless devices 310*f* may also receive the unicast third packet generated by the wireless device 310*a*. The wireless device 310*f* may determine to unicast the third message data from the wireless device 310*a* and its fifth message data to the wireless device 310*h*. As a result, the wireless device 310*f* may aggregate the third message data generated by the wireless device 310*a* with the fifth message data and unicast a fifth packet to the wireless device 310*h* with the aggregated third and fifth message.

The wireless device 310*h* may receive the unicast fifth packet with the aggregated third and fifth message data. The wireless device 310*h* may aggregate the aggregated third and fifth message with sixth message data generated by the wireless device 310*h* and broadcast the aggregated third, fifth, and sixth message data in a sixth packet to all of the wireless devices 310. In this manner, of the three talking wireless devices, e.g., the wireless devices 310*a*, 310*f*, and 310*h*, only the wireless device 310*h* is broadcasting packets to all of the wireless devices 310 in the network 300. The wireless devices 310*a* and 310*f* are only unicasting packets through the network 300 as described. As a result, fewer resources of the network 300 are used to distribute message data through the network 300.

The network 300 may continue to operate as outlined above. For example, the wireless device 310*f* may stop having message data to send. In these and other embodiments, the wireless device 310*a* may broadcast a packet, which may allow the wireless device 310*h* to provide unicast information to the wireless device 310*a* so that the wireless device 310*a* may begin unicasting packets to the wireless device 310*h* for broadcasting. Alternately or additionally, another wireless device 310 may begin broadcasting such that the wireless device 310*h* begins unicasting its message data and the message data from the wireless devices 310*f* and 310*a* to the other wireless device 310.

Figure 4:
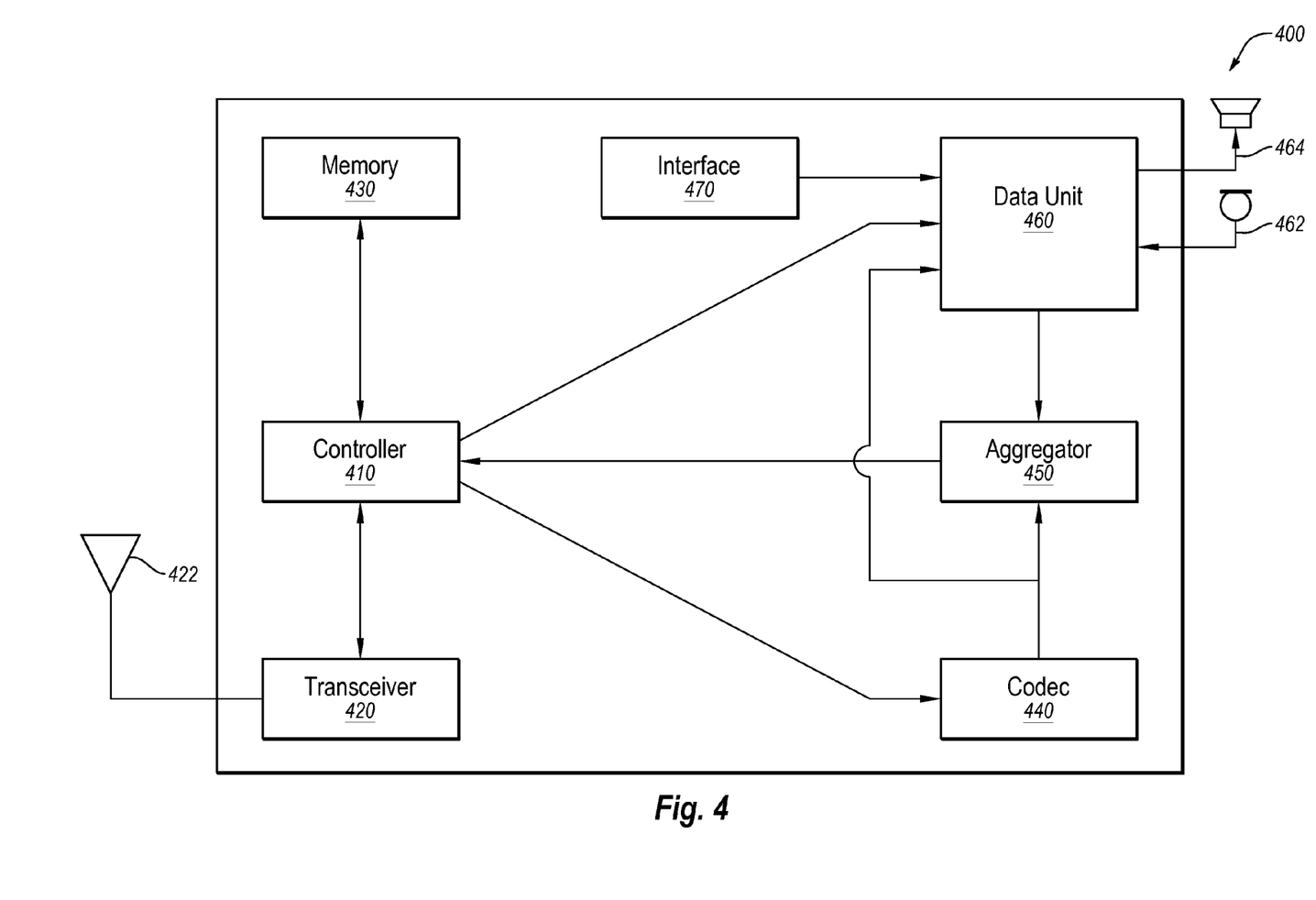
FIG. 4 illustrates an example wireless device that may be used in a wireless communication network.

FIG. 4 illustrates an example wireless device 400 that may be used in a wireless communication network, in accordance with at least one embodiment described herein. The wireless device 400 may include a controller 410, a transceiver 420, an antenna 422, a memory 430, a codec 440, an aggregator 450, a data unit 460, a microphone 462, a speaker 464, and an interface 470.

The transceiver 420 may be configured to receive wireless D2D communications, such as packets, from other wireless devices and/or access points by way of the antenna 422. The transceiver 420 may also be configured to transmit wireless D2D communications, such as packets, to other wireless devices and/or access points by way of the antenna 422. The transceiver 420 may send received packets to the controller 410.

The controller 410 may receive the received packets from the transceiver 420 and analyze the received packets to determine if the received packets have message data for presenting to a user of the wireless device 400. When the received packets have message data, the controller 410 may send the message data to the codec 440. Further details regarding the controller 410 are provided hereafter.

The interface 470 and the microphone 462 may be configured to receive input data from a user of the wireless device 400. For example, the interface 470 may be configured to receive messaging data or other data from a user of the wireless device 400 as the input data. The microphone 462 may be configured to receive voice data from a user of the wireless device 400 as the input data. The data unit 460 may be configured to receive the input data from the interface 470 and the microphone 462 and to generate message data based on the input data and send the message data to the aggregator 450.

The codec 440 may be configured to decode the message data from the controller 410 and provide the message data to the data unit 460. The data unit 460 may be further configured to provide message data from message data decoded by the codec 440 to a user of the wireless device 400 by way of the interface 470 and/or the speaker 464. For example, the data unit 460 may provide message data that includes voice data to the speaker 464 for presenting to the user. Alternately or additionally, the data unit 460 may provide message data that is messaging data to the interface 470 for presenting to the user. In some embodiments, the data unit 460 may determine when to present the message data to the user based on input from the controller 410.

The aggregator 450 may be configured to aggregate message data generated by the data unit 460 with message data from a received packet that is provided by the codec 440. The aggregator 450 may send the aggregated message data to the controller 410. Alternately, when there is no message data from a received packet, the aggregator 450 may provide the message data from the data unit 460 to the controller 410.

The controller 410 may be configured to receive packets from the transceiver 420 as indicated before. The controller 410 may temporarily store the packets in the memory 430 while the controller 410 determines whether to ignore and delete the received packet or take some action regarding the received packet. The action the controller 410 may take regarding a received packet may be determined based on the role of the wireless device 400, e.g., is the wireless device 400 a sink, a relaying, or a talking wireless device.

The controller 410 may be configured to determine a role for the wireless device 400 based on packets received by the transceiver 420, on message data generated based on input data, and/or information stored in the memory 430, such as a list of the neighbors of the wireless device 400.

For example, the controller 410 may determine that the wireless device 400 is a sink or relaying wireless device when no message data is being generated based on input data provided by a user of the wireless device 400. The controller 410 may analyze a received packet to determine whether the wireless device 400 is a sink or relaying wireless device.

In particular, the controller 410 may analyze the type of the received packet. When the packet is a broadcast packet the controller 410 may compare the neighboring wireless devices listed in the packet with the neighboring wireless devices of the wireless device 400 stored in the memory 430. When the neighboring wireless devices listed in the packet are all the same as the neighboring wireless devices of the wireless device 400 stored in the memory 430, the controller 410 may determine that the wireless device 400 is a sink wireless device. After determining the wireless device 400 is a sink wireless device, the controller 410 may direct the data unit 460 to present the message data from the received packet to a user of the wireless device 400.

When the neighboring wireless devices listed in the received packet are not all the same as the neighboring wireless devices of the wireless device 400 stored in the memory 430, the controller 410 may determine that the wireless device 400 is a relay wireless device. The controller 410 may direct the data unit 460 to present the message data from the received packet to a user of the wireless device 400. The controller 410 may also generate a broadcast packet based on the received packet that includes the neighbors of the wireless device 400. In some embodiments, the controller 410 may determine scheduling for transmission by its neighboring wireless devices and include the information in the packet. The controller 410 may then send the packet to the transceiver 420 for transmission.

In some embodiments, the received packet may be a unicast packet. When the received packet is a unicast packet, the controller 410 may determine whether the wireless device 400 is listed as a wireless device in the unicast path from the received packet. When the wireless device 400 is a wireless device in the unicast path from the received packet, the controller 410 may determine that the wireless device 400 is a relay wireless device and may rebroadcast the received packet as described above. When the wireless device 400 is not a wireless device in the unicast path from the received packet, the controller 410 may delete the received packet from the memory 430.

The controller 410 may determine that the wireless device 400 is a talking wireless device when the aggregator 450 provides message data based on input data from a user of the wireless device 400 to the controller 410. When the wireless device 400 is a talking wireless device, the controller 410 may also determine whether the wireless device 400 is a broadcasting talking wireless device or a unicast talking wireless device by analyzing packets received by the transceiver 420.

For example, when the aggregator 450 provides message data based on input data from a user of the wireless device 400 to the controller 410 and the wireless device 400 is not unicasting message data, the controller 410 may generate a packet with the message data and send the packet to the transceiver 420 for transmitting. The controller 410 may monitor received packets to determine if the wireless device 400 may continue broadcasting message data from a user of the wireless device 400 or if the wireless device may begin unicasting the message data to another wireless device.

When the controller 410 receive a packet with unicast path data indicating that another wireless device is also broadcasting and that the other wireless device is anticipating a unicast from the wireless device 400, the controller 410 may begin generating unicast packets and may send the unicast packets to the transceiver 420 for transmission.

When the controller 410 receives a packet with message data from another wireless device, the controller 410 may determine unicast path data between the wireless device 400 and the other wireless device based on information in the received packet. The controller 410 may generate a broadcast packet with the unicast path data and the aggregation of the message data from the other wireless device and the message data from the data unit 460. In these and other embodiments, the broadcast packet may also include the neighbors of the wireless device 400 and scheduling information for retransmission of the broadcast packet. Alternately or additionally, the broadcast packet may include information about the unicast configuration between the wireless device 400 and the other wireless device. The information about the unicast configuration may include termination of the unicast configuration, alterations of the unicast configuration, or other information. The controller 410 may send the broadcast packet to the transceiver 420 for transmission. In these and other embodiments, the unicast configuration between the controller 410 and the other wireless device may end when the controller 410 stops receiving unicast packets from the other wireless device after a particular time, the unicast packets from the other wireless device indicate the end of the unicast configuration, or the controller 410 determines to end the unicast configuration.

The controller 410 may be hardware that is configured to execute operations to cause the wireless device 400 to perform the operations described herein. In these and other embodiments, the hardware may execute operations by executing instructions stored in the memory 430. Alternately or additionally, the hardware may be an application specific integrated circuit (ASIC) or a field programmable gate array (FPGA) that is configured to execute operations to cause the wireless device 400 to perform the operations described herein. Alternately or additionally, the hardware may execute the operations using a combination of executions performed by ASIC/FPGA and executions performed by instructions stored in the memory 430. The memory 430 may be any computer-readable media as described herein. Modifications, additions, or omissions may be made to the wireless device 400 without departing from the scope of the present disclosure.

Figure 5:
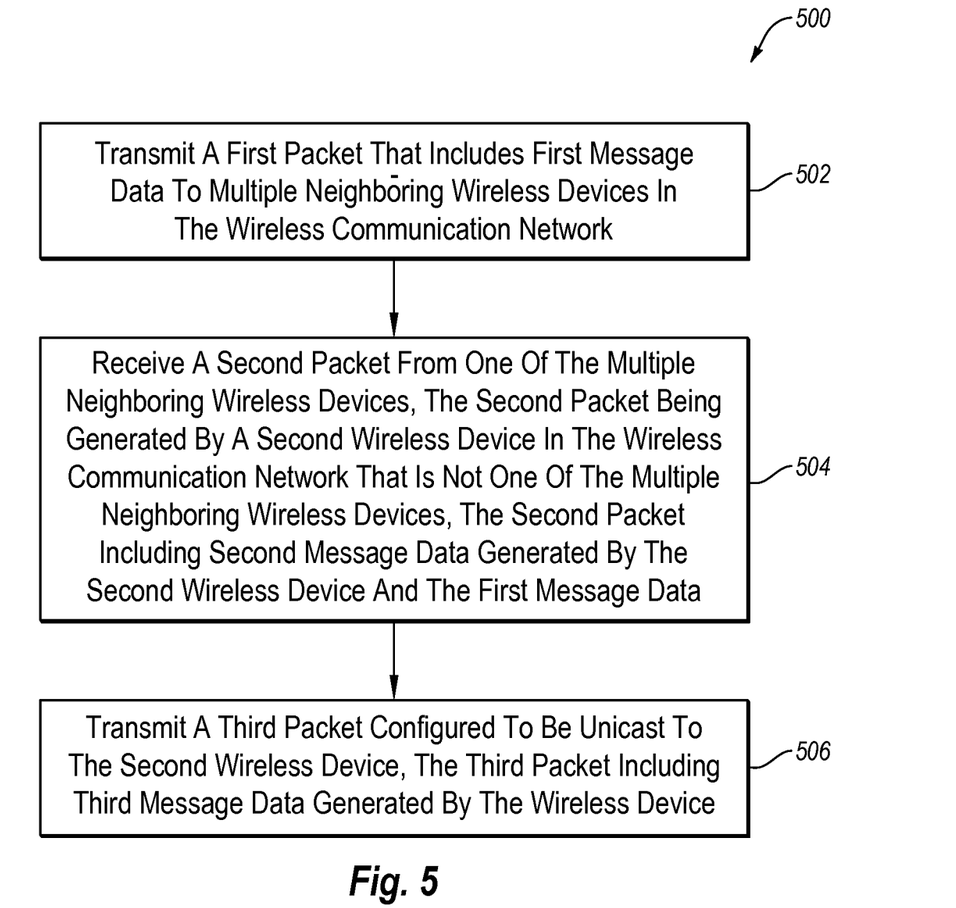
FIG. 5 is a flowchart of an example method of device-to-device communication by a wireless device in a wireless communication network.

FIG. 5 is a flowchart of an example method 500 of device-to-device communication by a wireless device in a wireless communication network, arranged in accordance with at least one embodiment of the present disclosure. The method 500 may be implemented, in some embodiments, by a wireless device, such as one of the wireless devices of FIGS. 1, 2A, 2B, and 3 or the wireless device 400 of FIG. 4. Although illustrated as discrete blocks, various blocks may be divided into additional blocks, combined into fewer blocks, or eliminated, depending on the desired implementation.

The method 500 may begin at block 502 where a first packet that includes first message data may be transmitted to multiple neighboring wireless devices in a wireless communication network. In some embodiments, the first packet may be configured to be broadcast to every wireless device within the wireless communication network. In some embodiments, the first packet may also include an indication of the multiple neighboring wireless devices and transmission scheduling information that may be used by the multiple neighboring wireless devices to schedule retransmission of the first packet.

At block 504, a second packet may be received from one of the multiple neighboring wireless devices. The second packet may be generated by a second wireless device in the wireless communication network that is not one of the multiple neighboring wireless devices. The second packet may also include second message data generated by the second wireless device and the first message data.

At block 506, a third packet configured to be unicast to the second wireless device may be transmitted. In some embodiments, the third packet may be transmitted in response to the reception of the second packet. The third packet may include third message data generated by the wireless device. In some embodiments, the third packet being configured to be unicast to the second wireless device may include the third packet being configured to be relayed to the second wireless device by way of one of the multiple neighboring wireless devices without distribution to every wireless device within the wireless communication network. In these and other embodiments, the one of the multiple neighboring wireless devices that relays the third packet may be the same or a different one of the multiple neighboring wireless devices that provides the second packet to the wireless device.

In some embodiments, the second packet may further include unicast path data. The unicast path data may indicate a unicast path between the wireless device and the second wireless device using one or more wireless devices of the wireless communication network. In these and other embodiments, the third packet may include the unicast path data and may be configured to be unicast along the unicast path. Alternately or additionally, the one or more wireless devices included in the unicast path may include one or more of the multiple neighboring wireless devices.

One skilled in the art will appreciate that, for method 500 and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, in some embodiments, the method 500 may further include receiving a fourth packet from a second one of the multiple neighboring wireless devices. In these and other embodiments, the fourth packet may be generated by a third wireless device in the wireless communication network that is not one of the multiple neighboring wireless devices. The fourth packet may include fourth message data generated by the second wireless device, fifth message data generated by the third wireless device, and the third message data from the wireless device.

Embodiments described herein, may be implemented using computer-readable media for carrying or having computer-executable instructions or data structures stored thereon. Such computer-readable media may be any available media that may be accessed by a general purpose or special purpose computer (e.g., a processor). By way of example, and not limitation, such computer-readable media may include a non-transitory or tangible computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions include, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the systems and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modules running on a computing system.

All examples and conditional language recited herein are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method of device-to-device communication by a wireless device in a wireless communication network without direction from an access point of the wireless communication network, the method comprising:
    transmitting a first packet that includes first message data to a plurality of neighboring wireless devices in the wireless communication network, the plurality of neighboring wireless devices in the wireless communication network being the only wireless devices in the wireless communication network with which the wireless device directly wirelessly communicates;
    receiving a second packet from one of the plurality of neighboring wireless devices in the wireless communication network without direction from an access point of the wireless communication network, the second packet including the first message data and second message data generated by a second wireless device in the wireless communication network that is not one of the plurality of neighboring wireless devices of the wireless device; and in response to receiving the second packet, transmitting a third packet configured to be unicast to the second wireless device, the third packet including third message data generated by the wireless device, the second wireless device configured to broadcast the third message data so that the third message data is distributed to every wireless device within the wireless communication network without direction from an access point of the wireless communication network.

2. The method of claim 1, wherein the first packet is configured to be broadcast to every wireless device within the wireless communication network.

3. The method of claim 1, wherein the one of the plurality of neighboring wireless devices is a first one of the plurality of neighboring wireless devices, wherein the third packet being configured to be unicast to the second wireless device includes the third packet being configured to be relayed to the second wireless device by way of a second one of the plurality of neighboring wireless devices without distribution to every wireless device within the wireless communication network.

4. The method of claim 3, wherein the first one of the plurality of neighboring wireless devices and the second one of the plurality of neighboring wireless devices are the same wireless device.

5. The method of claim 1, wherein the second packet further includes path data, the path data indicating a unicast path between the wireless device and the second wireless device using one or more wireless devices of the wireless communication network, wherein the third packet includes the path data and the third packet is configured to be unicast along the unicast path.

6. The method of claim 5, wherein the one or more wireless devices of the wireless communication network includes one or more of the plurality of neighboring wireless devices.

7. The method of claim 1, wherein the one of the plurality of neighboring wireless devices is a first one of the plurality of neighboring wireless devices, the method further comprising receiving a fourth packet from a second one of the plurality of neighboring wireless devices, the fourth packet generated by a third wireless device in the wireless communication network that is not one of the plurality of neighboring wireless devices, wherein the fourth packet includes fourth message data generated by the second wireless device, fifth message data generated by the third wireless device, and the third message data.

8. The method of claim 1, wherein the first packet includes an indication of the plurality of neighboring wireless devices and transmission scheduling information used by the plurality of neighboring wireless devices to schedule retransmission of the first packet.

9. Hardware including a processor and attached memory configured to execute operations to cause a wireless device in a wireless communication network system to perform operations for device-to-device communication, the operations comprising:

transmitting a first packet that includes first message data to a plurality of neighboring wireless devices in a wireless communication network, the plurality of neighboring wireless devices in the wireless communication network being the only wireless devices in the wireless communication network with which the wireless device directly wirelessly communicates;

receiving a second packet from one of the plurality of neighboring wireless devices in the wireless communication network without direction from an access point of the wireless communication network, the second packet including the first message data and second message data generated by a second wireless device in the wireless communication network that is not one of the plurality of neighboring wireless devices of the wireless device; and in response to receiving the second packet, transmitting a third packet configured to be unicast to the second wireless device, the third packet including third message data generated by the wireless device, the second wireless device configured to broadcast the third message data so that the third message data is distributed to every wireless device within the wireless communication network without direction from an access point of the wireless communication network.

10. The hardware of claim 9, wherein the first packet is configured to be broadcast to every wireless device within the wireless communication network.

11. The hardware of claim 9, wherein the one of the plurality of neighboring wireless devices is a first one of the plurality of neighboring wireless devices, wherein the third packet being configured to be unicast to the second wireless device includes the third packet being configured to be relayed to the second wireless device by way of a second one of the plurality of neighboring wireless devices without distribution to every wireless device within the wireless communication network.

12. The hardware of claim 11, wherein the first one of the plurality of neighboring wireless devices and the second one of the plurality of neighboring wireless devices are the same wireless device.

13. The hardware of claim 9, wherein the second packet further includes path data, the path data indicating a unicast path between the wireless device and the second wireless device using one or more wireless devices of the wireless communication network, wherein the third packet includes the path data and the third packet is configured to be unicast along the unicast path.

14. The hardware of claim 13, wherein the one or more wireless devices of the wireless communication network includes one or more of the plurality of neighboring wireless devices.

15. The hardware of claim 9, wherein the one of the plurality of neighboring wireless devices is a first one of the plurality of neighboring wireless devices, wherein the operations further comprise receiving a fourth packet from a third one of the plurality of neighboring wireless devices, the fourth packet generated by a third wireless device in the wireless communication network that is not one of the plurality of neighboring wireless devices, wherein the fourth packet includes fourth message data generated by the second wireless device, fifth message data generated by the third wireless device, and the third message data.

16. The hardware of claim 9, wherein the first packet includes an indication of the plurality of neighboring wireless devices and transmission scheduling information used by the plurality of neighboring wireless devices to schedule retransmission of the first packet.

17. A wireless device comprising:
a transceiver configured to:
transmit a first packet;
receive a second packet from one of a plurality of neighboring wireless devices in a wireless communication network without direction from an access point of the wireless communication network, the plurality of neighboring wireless devices in the wireless communication network being the only wireless devices in the wireless communication network with which the wireless device directly wirelessly communicates, the second packet including first message data generated by the wireless device and second message data generated by a second wireless device in the wireless communication network that includes the wireless device that is not one of the plurality of neighboring wireless devices of the wireless device; and transmit a third packet; and a controller configured to:

generate the first packet that includes the first message data, the first packet configured to be transmitted to the plurality of neighboring wireless devices; and generate the third packet that includes third message data generated by the wireless device in response to receiving the second packet, the third packet configured to be unicast to the second wireless device, the second wireless device configured to broadcast the third message data so that the third message data is distributed to every wireless device within the wireless communication network without direction from an access point of the wireless communication network.

18. The wireless device of claim 17, wherein the first packet is configured to be broadcast to every wireless device within the wireless communication network.

19. The wireless device of claim 17, wherein the one of the plurality of neighboring wireless devices is a first one of the plurality of neighboring wireless devices, wherein the unicasting of the third packet to the second wireless device includes the third packet being configured to be relayed to the second wireless device by way of a second one of the plurality of neighboring wireless devices without distribution to every wireless device within the wireless communication network.

20. The wireless device of claim 17, wherein the second packet further includes path data, the path data indicating a unicast path between the wireless device and the second wireless device using one or more wireless devices of the wireless communication network, wherein the controller is configured to generate the third packet to include the path data such that the third packet is configured to be unicast along the unicast path.

21. The wireless device of claim 17, wherein the one of the plurality of neighboring wireless devices is a first one of the plurality of neighboring wireless devices, wherein the transceiver is further configured to receive a fourth packet from a second one of the plurality of neighboring wireless devices, the fourth packet generated by a third wireless device in the wireless communication network that is not one of the plurality of neighboring wireless devices, wherein the fourth packet includes fourth message data generated by the second wireless device, fifth message data generated by the third wireless device, and the third message data.

22. The wireless device of claim 17, wherein the controller is configured to generate the first packet to include an indication of the plurality of neighboring wireless devices and to generate transmission scheduling information used by the plurality of neighboring wireless devices to schedule retransmission of the first packet.

* * * * *